(12) United States Patent
Sakurai et al.

(10) Patent No.: US 8,684,316 B2
(45) Date of Patent: Apr. 1, 2014

(54) AIRCRAFT FLAP MECHANISM HAVING COMPACT LARGE FOWLER MOTION PROVIDING MULTIPLE CRUISE POSITIONS

(75) Inventors: Seiya Sakurai, Seattle, WA (US); James M. Wheaton, Collierville, TN (US); Stephen J. Fox, Everett, WA (US); Sharon Xiangdong Che, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 13/242,296

(22) Filed: Sep. 23, 2011

(65) Prior Publication Data

US 2013/0075537 A1    Mar. 28, 2013

(51) Int. Cl.
*B64C 9/18*        (2006.01)
*B64C 13/28*     (2006.01)

(52) U.S. Cl.
USPC ............................. 244/216; 244/215; 244/99.3

(58) Field of Classification Search
USPC .................................. 244/99.2, 99.3, 212–216
See application file for complete search history.

(56) References Cited

U.S. PATENT DOCUMENTS

| | | |
|---|---|---|
| 3,853,289 A | 12/1974 | Nevermann et al. |
| 4,248,395 A | 2/1981 | Cole |
| 4,542,869 A | 9/1985 | Brine |
| 4,605,187 A | 8/1986 | Stephenson |
| 4,702,442 A | 10/1987 | Weiland et al. |
| RE32,907 E | 4/1989 | Rudolph |
| 7,292,744 B2 | 11/2007 | Ouchi |
| 7,338,018 B2 | 3/2008 | Huynh et al. |
| 7,578,484 B2 | 8/2009 | Fox et al. |
| 7,600,718 B2 | 10/2009 | Perez-Sanchez |
| 7,891,611 B2 | 2/2011 | Huynh et al. |
| 7,945,425 B2 | 5/2011 | Marx et al. |
| 2002/0047068 A1 | 4/2002 | Uchida et al. |
| 2006/0226296 A1 | 10/2006 | Perez-Sanchez |
| 2012/0248257 A1* | 10/2012 | Eichhorn et al. ............. 244/214 |

FOREIGN PATENT DOCUMENTS

| | | |
|---|---|---|
| NL | 8600616 A | 10/1987 |
| WO | 2008129074 A1 | 10/2008 |

OTHER PUBLICATIONS

Slocum, Alexander H., "FUNdaMENTALS of Design", Topic 4 Linkages, MIT Precision Engineering Research Group (PERG), 2008, pp. 4-22.

* cited by examiner

*Primary Examiner* — Rob Swiatek
*Assistant Examiner* — Vicente Rodriguez
(74) *Attorney, Agent, or Firm* — Felix L. Fischer

(57) ABSTRACT

A trailing edge flap mechanism incorporates a support beam, a flap carrier beam supporting an aerodynamic flap, a first link interconnecting a first and second rotation points and a second link interconnecting third and fourth rotation points. The support beam has a ground connection on a first fixed axis of rotation. A connecting link has a ground connection on a second fixed axis of rotation and is connected to the first link intermediate the first and second rotation points. An actuator is connected with a drive link pivotally engaged to the first link for initial forward and aft movement of a nose profile of the Fowler flap substantially parallel to the wing lower surface with extending aft movement providing a rapidly changing angle of the flap with respect to the wing upper surface.

22 Claims, 23 Drawing Sheets

AIRCRAFT FLAP MECHANISM HAVING COMPACT LARGE FOWLER MOTION PROVIDING MULTIPLE CRUISE POSITIONS

REFERENCE TO RELATED APPLICATIONS

This application is copending with application Ser. No. 12/835,925 entitled AIRCRAFT FLAP ACTUATOR ASSEMBLY filed on Jul. 14, 2010 having a common assignee with the present application, the disclosure of which is incorporated herein by reference as though fully set forth.

BACKGROUND INFORMATION

1. Field

Embodiments of the disclosure relate generally to the field of aerodynamic flap extension mechanisms for aircraft and more particularly to a compact operating linkage with substantially linear motion in a small range about the retracted position but providing large Fowler extension and rapid droop.

2. Background

For modern commercial jet aircraft, flaps which work with drooping spoilers for take-off and landing positions and also provide a small range of cruise positions are becoming necessary for improved efficiency. The flap mechanism required for this very desirable capability, when combined with a need for large Fowler motion, can be deep and wide and require a large aerodynamic fairing which causes excessive cruise drag.

The combination of drooping spoiler landing positions and multiple cruise positions known as "trailing edge variable camber" (TEVC) has been recently introduced in commercial aircraft. Current designs have relatively small trailing edge flaps with relatively small Fowler motion, i.e. aftward motion that increases the wing chord length or plan form. An example of a current design is a simple hinged flap where the flap pivots about a spanwise hinge axis which is stationary with respect to the wing fixed primary structure. With the need for larger flaps and increased Fowler motion, the flap hinge axis must be offset a greater distance below the wing. This results in a larger fairing to accommodate a deeper hinge and larger flap support structure. The larger fairing increases airplane aerodynamic drag. An example of such simple hinged flap is described in U.S. Pat. No. 7,891,611.

It is therefore desirable to provide a flap system with large Fowler motion and good take-off and landing flap positions compatible with drooping spoilers, and also a range of aerodynamically sealable cruise positions, all in a compact package for greatly improved cruise drag.

SUMMARY

Embodiments disclosed herein provide a trailing edge flap linkage for large Fowler extension, trailing edge variable camber and drooped motion. The linkage includes: 1) a support beam having a first portion with a first rotation axis and a fourth rotation axis aft of the first rotation axis; 2) a flap carrier beam supporting an aerodynamic flap with a second rotation axis at a forward end and a third rotation axis on the flap itself. For an example embodiment, the third rotation axis is within a nose contour of the flap aft of the second rotation axis; 3) a first link interconnecting the first rotation axis and second rotation axis and 4) a second link interconnecting the third rotation axis and fourth rotation axis. The support beam further has a second portion extending angularly forward from the first portion and with a fifth rotation axis at a forward end for ground connection as a first fixed hinge axis. A connection link has a sixth rotation axis at a forward end for ground connection as a second fixed hinge axis and a seventh rotation axis connected to the first link intermediate the first and second rotation axes. An actuation system is operably connected between a fixed portion of a wing structure and the first link. In first embodiment the actuation system may include a linear actuator such as a telescoping hydraulic actuator or a ballscrew actuator. In a second embodiment the actuation system may include a rotary actuator, a crank arm and a drive link. Operation of the actuation system causes the flap to move to a deployed or stowed position or positions therebetween.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a mechanism with large flap Fowler motion in a compact volume. Differences in kinematics and link arrangements are provided which allow the initial forward or aft movement in the flaps to be relatively small and roughly parallel with the wing lower surface while driving a rapid change in angle (for the TEVC range) and, after moving out of the TEVC range of motion providing more rapid fowler extension with changing angle. This is crucial for TEVC capability and also for intermediate flap positions with drooped spoilers.

Figure 1A:
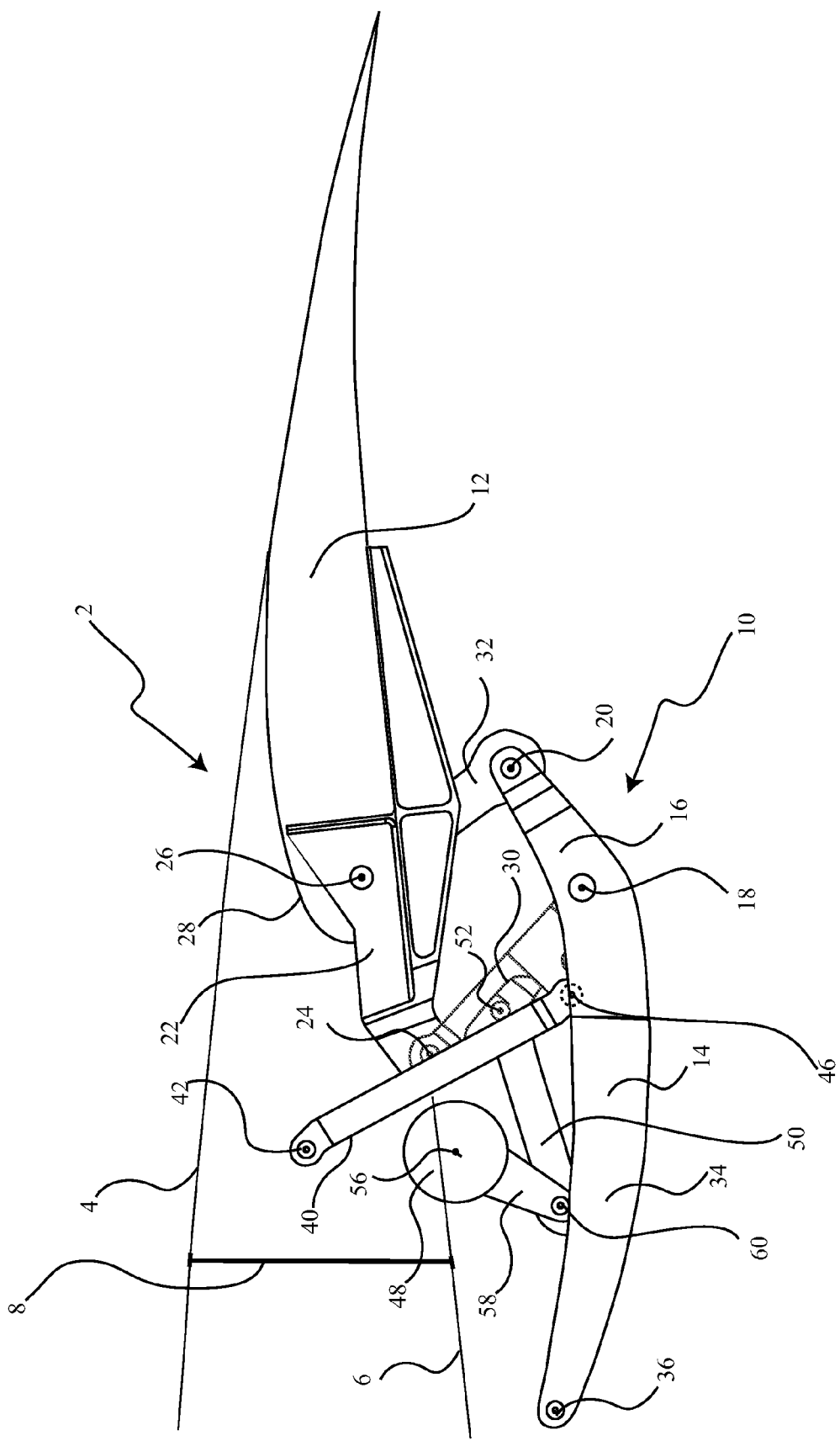
FIG. 1A is a side view of an embodiment of the aircraft flap mechanism.
Figure 1B:
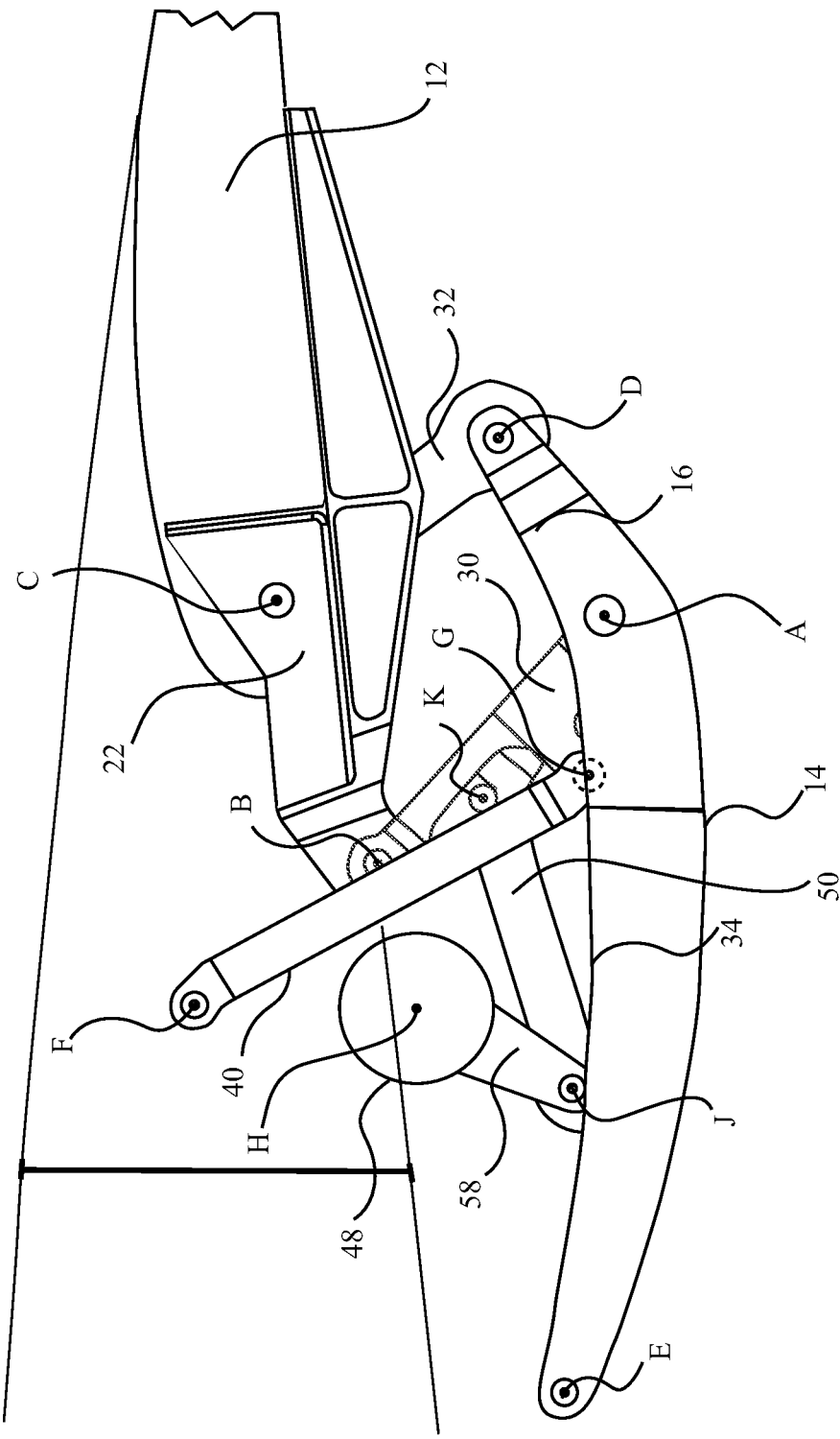
FIG. 1B is a side view enlarging the linkage elements.

As shown in FIG. 1 for an example embodiment, a pivoted mechanism for a flap 12 provides large Fowler motion, TEVC and droop motion. Mounted in a wing 2 having an upper surface 4 and a lower surface 6 with a rear spar 8 the mechanism incorporates a hinge supported quadrilateral linkage having a support beam 14 with an aft portion 16 having a rotation axis, depicted as point A, 18, and a rotation axis, depicted as point D, 20, aft of rotation axis point A. A flap carrier beam 22 supporting aerodynamic flap 12, has a rotation axis, depicted as point B, 24, at a forward end and a rotation axis, depicted as point C, 26, aft of the rotation axis at point B, within a nose contour 28 of the flap 12. In alternative embodiments, the rotation axis at point 26 can be located on other parts of the flap. An AB link 30 interconnects the rotation axis at point A on the support beam 14 and the rotation axis at point B on the flap carrier beam 22. A CD link 32 interconnects the rotation axis at point C on the flap carrier beam 22 and the rotation axis at point D on the support beam 14. The rotation points described herein are two dimensional constructs for describing rotation of the linkage elements in a plane perpendicular to the motion of the linkage elements. In actual application, the motion may not be entirely two-dimensional and the axes represented by the points may be swiveling axes. Any flap on a swept wing, where the flap span is angled to the airstream and the support is parallel to the airstream, will introduce an out-of-plane component of flap motion. This out-of-plane translation, skew, or misalignment, is accommodated by ball joints at points B, C, and D as will be described in greater detail subsequently. The CD link may skew in and out of the mechanism plane disclosed in the drawings depending on where the flap is in its travel.

The support beam 14 has a forward portion 34 extending angularly forward from the aft portion 16 which has a rotation axis, depicted as point E, 36, at a forward end for connection to the fixed wing structure on a first fixed hinge axis 38 (best seen in FIGS. 2A and 2B and described subsequently). A connection link 40 has a rotation axis, depicted as point F, 42, at a forward end for connection to the fixed wing structure on a second fixed hinge axis 44 (best seen in FIGS. 2A and 2B and described subsequently) and a rotation axis, depicted as point G, 46, connected to the AB link 30 between the rotation axes of points A and B. A rotary arm, crank arm, or link 58 is connected with a input or connecting link 50 pivotally engaged at a rotation axis, depicted as point J, 60. A distal end of link 50 pivotally engages at a rotation axis depicted as point K, 52, on link 30. For the example embodiment, the rotary arm, crank arm, or link 58 is driven by a rotary actuator 48 pivoting about an axis of rotation 54 (best seen in FIG. 2B and subsequently described) at point H, 56, which is attached to the structure nominally adjacent the rear spar 8 of the wing. In alternative embodiments, an alternative to the rotary actuator may be a linear actuator connected directly to the AB link 30 at point K replacing links 50 and 58 with a ram or screw drive integral to the linear actuator.

As will be demonstrated with respect to various flap positions subsequently, actuation by the drive link 50 provides initial forward and aft movement of the nose contour of the Fowler flap on a profile 61 substantially parallel to the wing lower surface. This motion is optimized for TEVC operation of the flap 12 from a TEVC up position to a TEVC down position. A modest extension of the flap aft provides a rapidly changing flap trailing edge down angle, and a modest retraction of the flap forward provides a rapidly changing flap trailing edge up angle. This aspect of flap motion is important for keeping the flap and the mechanism fairing sealed (i.e. no gaps) throughout the range of cruise TEVC, yet providing the described range of angular travel.

Figure 2A:
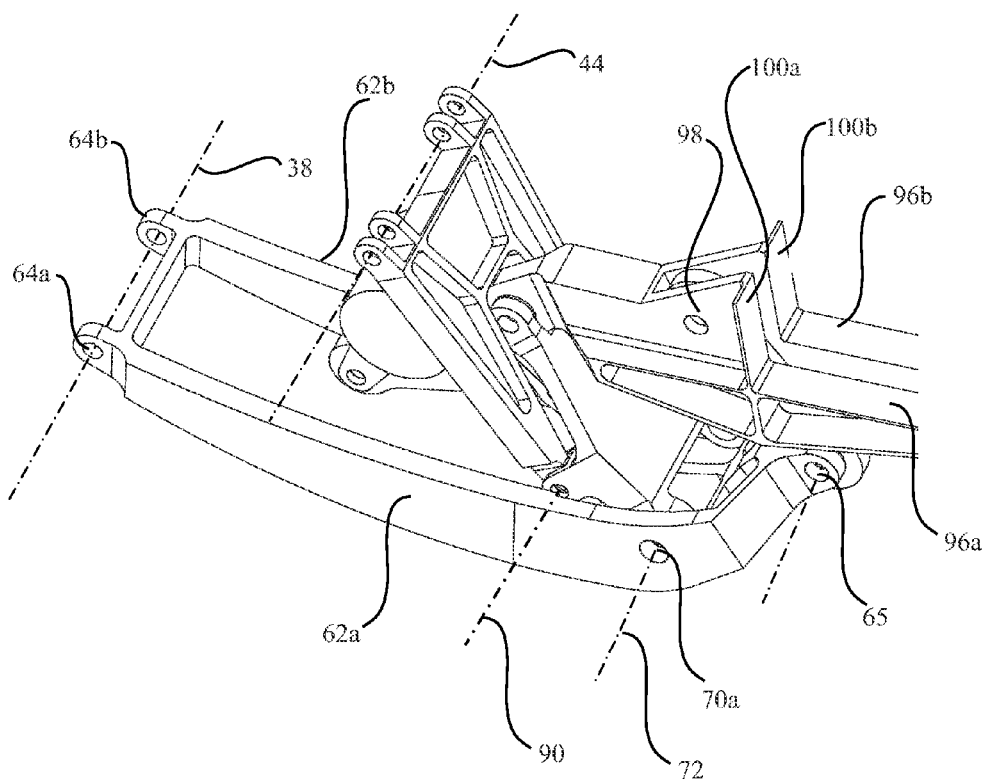
FIG. 2A is a top aft isometric view of the elements of the linkage in the flaps stowed position.
Figure 2B:
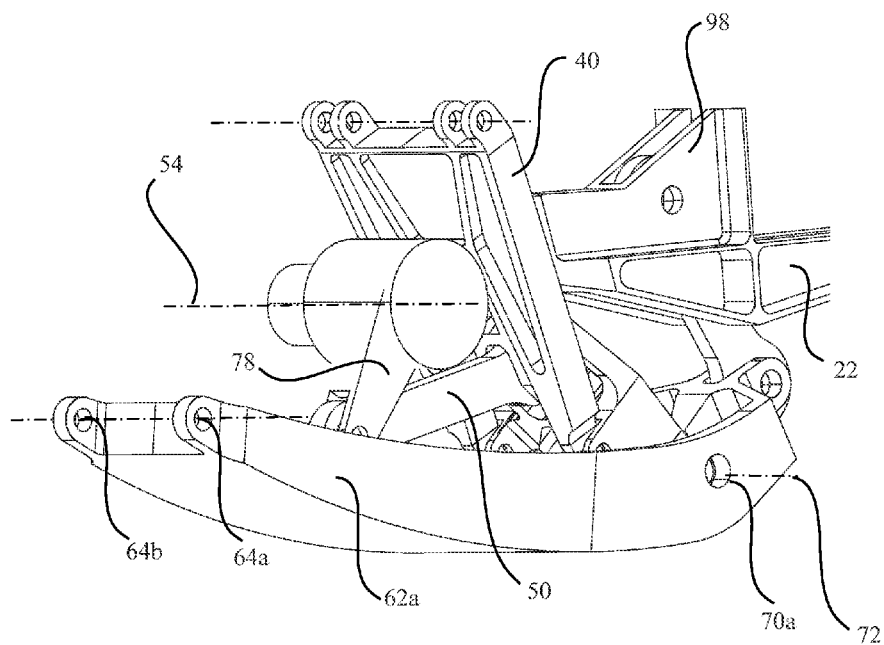
FIG. 2B is a bottom forward isometric view of the elements as shown in FIG. 2A.

Details of the compact structure for the mechanism are shown in FIGS. 2A and 2B. The mechanism provides torsional flexural rigidity and side load reaction capability for the flap operating structure but allows free pinned motion for the actual connection of the aerodynamic flap to the structure. The forward portion 34 of support beam 14 has siamesed members 62a and 62b terminating in bearing bores 64a and 64b centered on first rotation axis 38 at the forward end. The spaced siamesed members 62a, 62b provide torsional rigidity for the support beam 14 while providing compactness through allowing recessed clearance for elements of the AB link 30, connection link 40 and drive link 50 to operate between the flanges during portions of their range of motion. Aft portion 16 of the support beam converges to a clevis 65 to receive a ball joint or spherical bearing in the lower termination of CD link 32 at the rotation axis of point D.

Figure 3A:
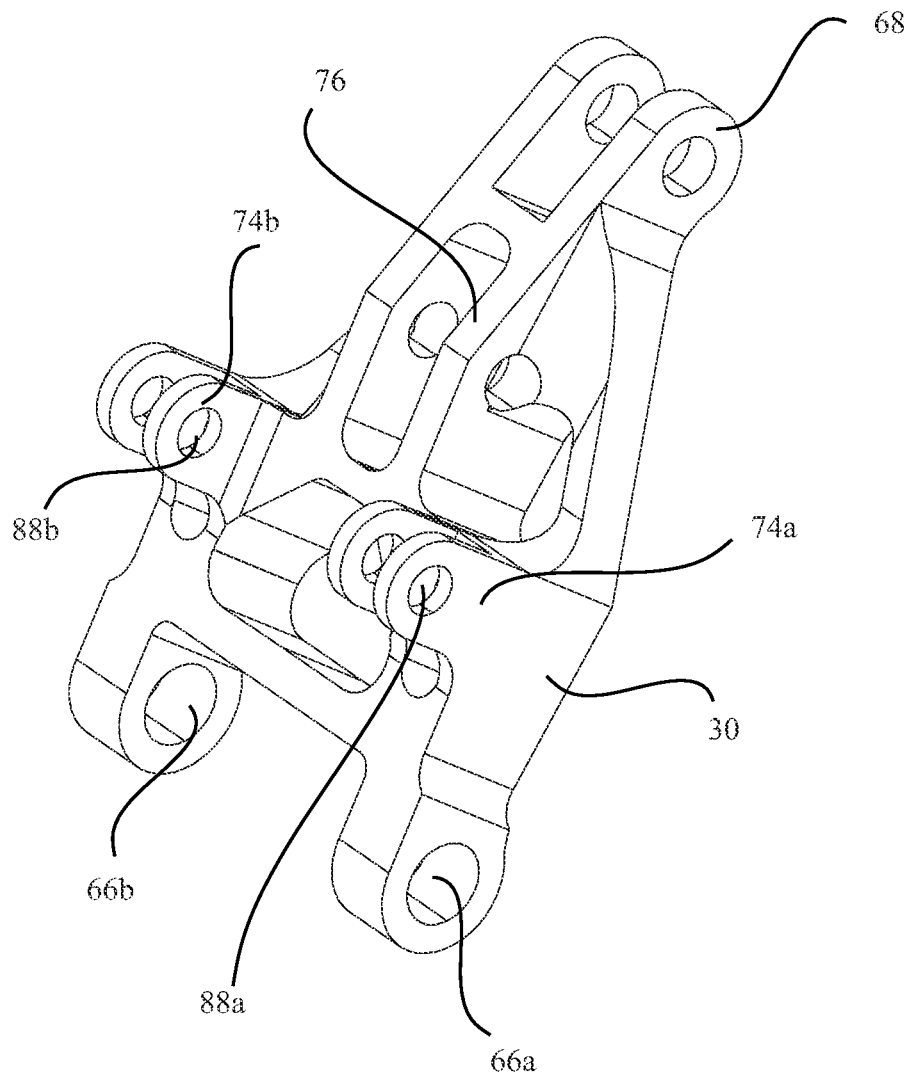
FIGS. 3A and 3B are isometric views of the AB link.
Figure 3B:
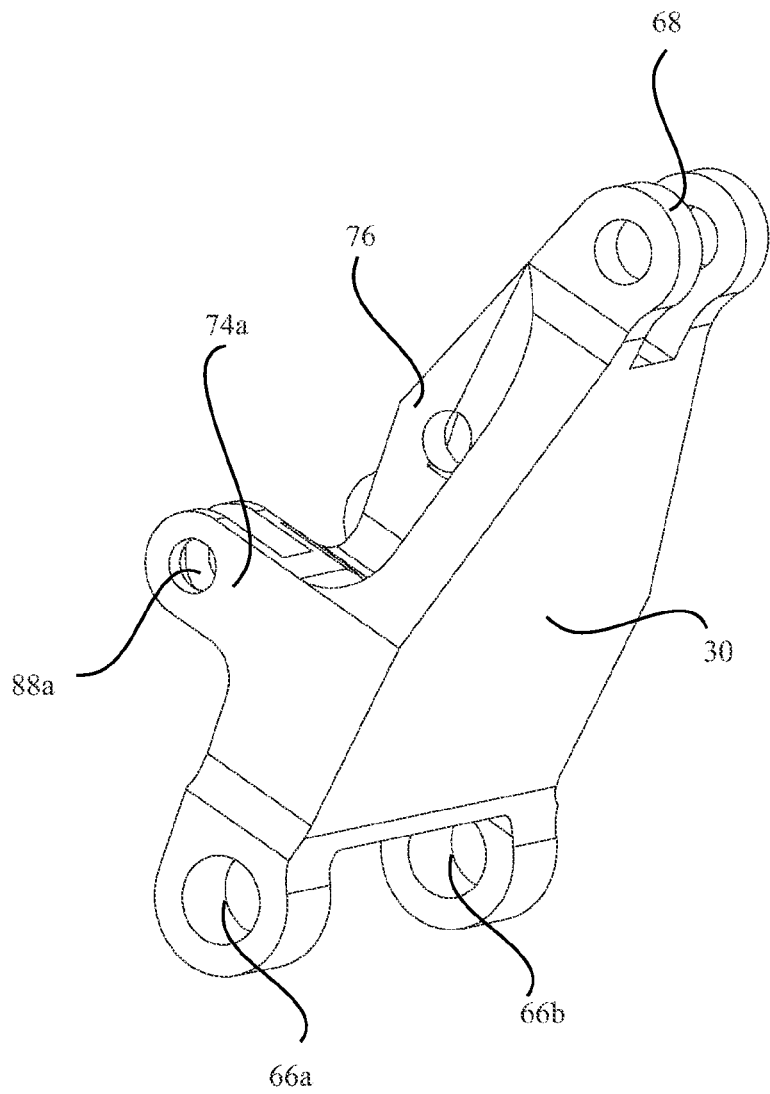

The AB link 30, shown in detail in FIGS. 3A and 3B, is an A-frame structure having bearing bores 66a and 66b on the feet and a clevis 68 at the vertex to receive a spherical bearing mounted in the flap carrier beam 22 (shown and described with respect to FIGS. 3E and 3F below). Bearing bores 66a, 66b in the AB link align with the bearing bores 70a, 70b of the support beam forming a fourth rotation axis 72 for rotation point A. The spaced arrangement of the feet of the AB link for pivotal connection to the support beam flanges also enhances the desired torsional rigidity.

Forwardly extending blades 74a and 74b are provided for pivotal attachment to the connection link 40, as will be described in greater detail subsequently. A clevis 76 on a forward face of the AB link receives a spherical bearing in an aft end of drive link 50. A clevis 78 on a lower end of crank arm 58 extending from rotary actuator 48 receives a spherical bearing in a forward end of drive link 50 (best seen in FIGS. 2A and 2B).

Figure 3C:
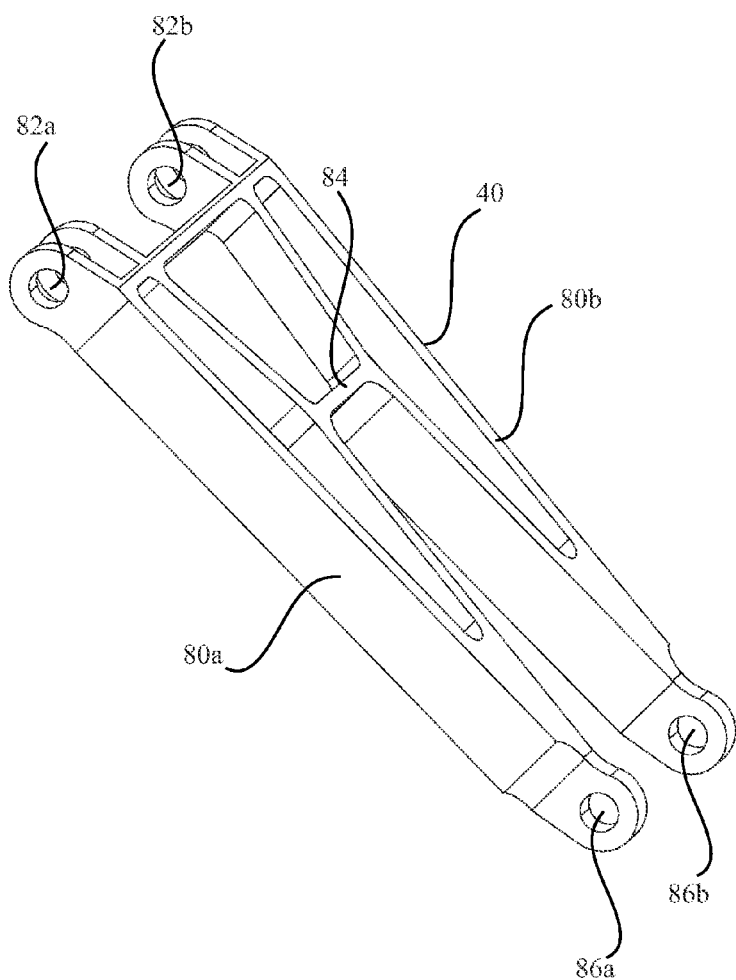
FIGS. 3C and 3D are isometric views of the connection link.
Figure 3D:
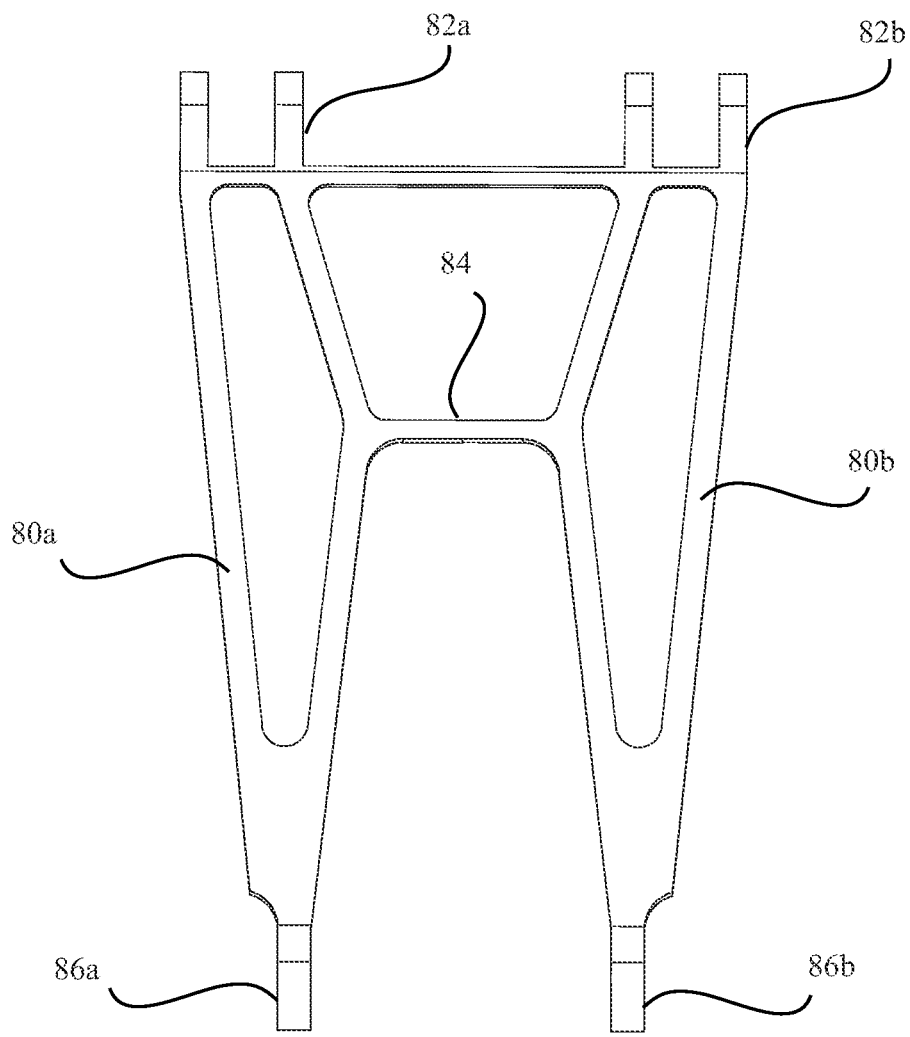

FIGS. 3C and 3D show the connection link 40 in detail. The connection link is an H structure having side flanges 80a and 80b with bearing bores 82a and 82b at a top end aligned with second rotational axis 44. A bridge 84 in combination with the spacing of side flanges 80a and 80b provides additional torsional rigidity in the connection link while allowing the vertex of the AB link and interconnected nose of the flap carrier beam to be received through the connection link in the retracted positions (as seen in FIGS. 2A and 2B, 4A and 4B). Bearing bores 86a and 86b at bottom ends of the side flanges 80a and 80b align with bearing bores 88a and 88b in the blades 74a and 74b to engage the AB link 30 providing a rotational axis 90 depicted as point G. The extension of the blades forward from the main body of the AB link places the rotation axis at point G in substantial alignment intermediate the rotation axes at points E and A on the support beam. This combination tends to make the connection link between points F and G dwell in the TEVC range allowing the support beam AB link to act as a rocker arm rotating about a nearly stationary point G. The momentary orientation of the AB link and its rocker arm motion act to move flap attachment point B in a direction roughly parallel with the lower surface of the wing and at the same time moves point A strongly in an up/down direction. Due to the extension of the support beam from point A to point D, the up/down movement of point A about rotation point E serves as a multiplier for up/down movement of point D which in turn moves the CD link strongly up or down. The combination of flap attachment point B moving parallel with the wing lower surface and the CD link and flap attachment point D moving strongly up/down gives a flap motion where the flap nose stays roughly on contour and the trailing edge of the flap moves strongly up or down, or in other words the flap angle changes relatively quickly as the flap translates fore/aft. Further extension of the flap mechanism takes the connection link out of its dwell and allows it to rotate about point F. The AB link continues a rocker arm motion about a now moving point G. Point A now continues to move strongly in a downward direction about rotation point E, pulling both flap attachment points B and D down which works to position the flap properly for the drooped spoiler in the shallow takeoff position.

Figure 3E:
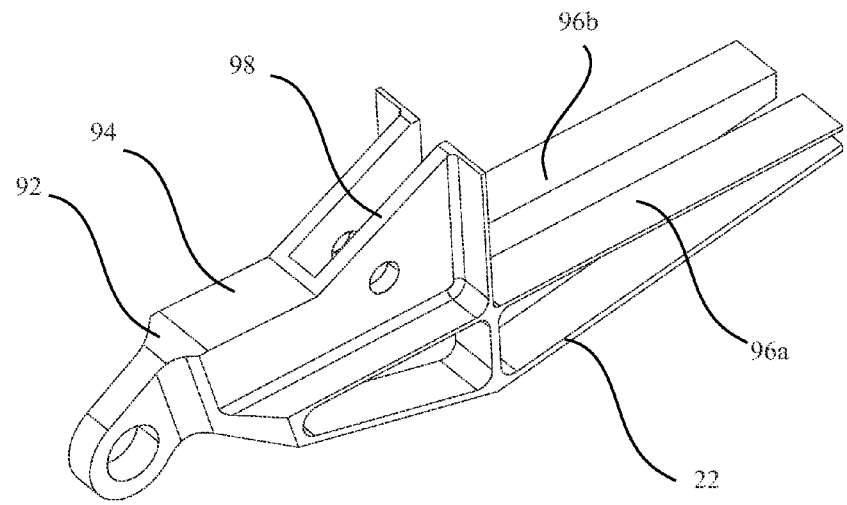
FIGS. 3E and 3F are isometric views of the flap carrier beam.
Figure 3F:
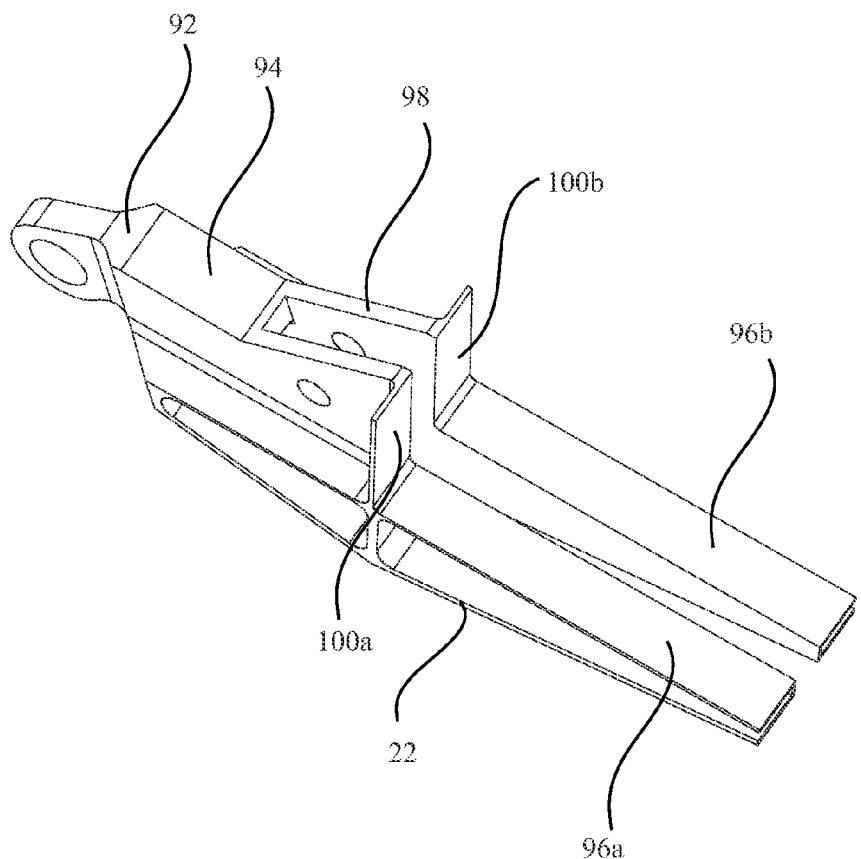

Flap carrier beam 22 is shown in detail in FIGS. 3E and 3F. A nose portion 92 extending from a body 94 houses a spherical bearing and is received in the clevis 68 at the vertex of the AB link 30 for rotational attachment at rotation point B. The flap carrier beam is bifurcated aft of the body 94 with horizontal supports 96a and 96b for the aerodynamic flap 12. The bifurcation provides a clevis 98 to receive a spherical bearing in the upper end of the CD link for rotational attachment at rotation point C and allows the CD link to be received within the beam during a portion of its travel (as best seen in FIGS. 2A, 2B, and 4A-4G) additionally enhancing the compactness of the mechanism. Laterally extending flanges 100a and 100b provide attachment points to a nose spar in the flap 12. The shape and structure of the flap carrier beam shown and described provide one example embodiment for the actual flap attachment. Other structural forms may be employed in alternative embodiments.

The laterally spaced rotational attachments of the support beam forward portion 34 at rotation point E, connecting link 40 at rotation point F, AB link at point A and connecting link and AB link at point G provides torsional rigidity for the mechanism which is important for reacting side loads inherent in streamwise extending mechanisms on swept flaps. Spherical bearing interconnections of the AB link 22 and flap carrier beam 22 nose portion 92 at point B, the clevis 98 in the flap carrier beam and the upper termination of the CD link 32 and the clevis 65 in the support beam aft portion 16 and lower termination of the CD link at point D allow flexing of the flap during operation without binding of the operating mechanism links, and allow out of plane flap motion inherent in streamwise extending mechanisms on swept flaps and/or conical motion due to flaps with tapering planforms. Spherical bearing connection of the forward termination of drive link 50 in clevis 78 on crank arm 58 and aft termination of the drive link in clevis 76 extending from the AB link prevents binding of the drive link.

Figure 4A:
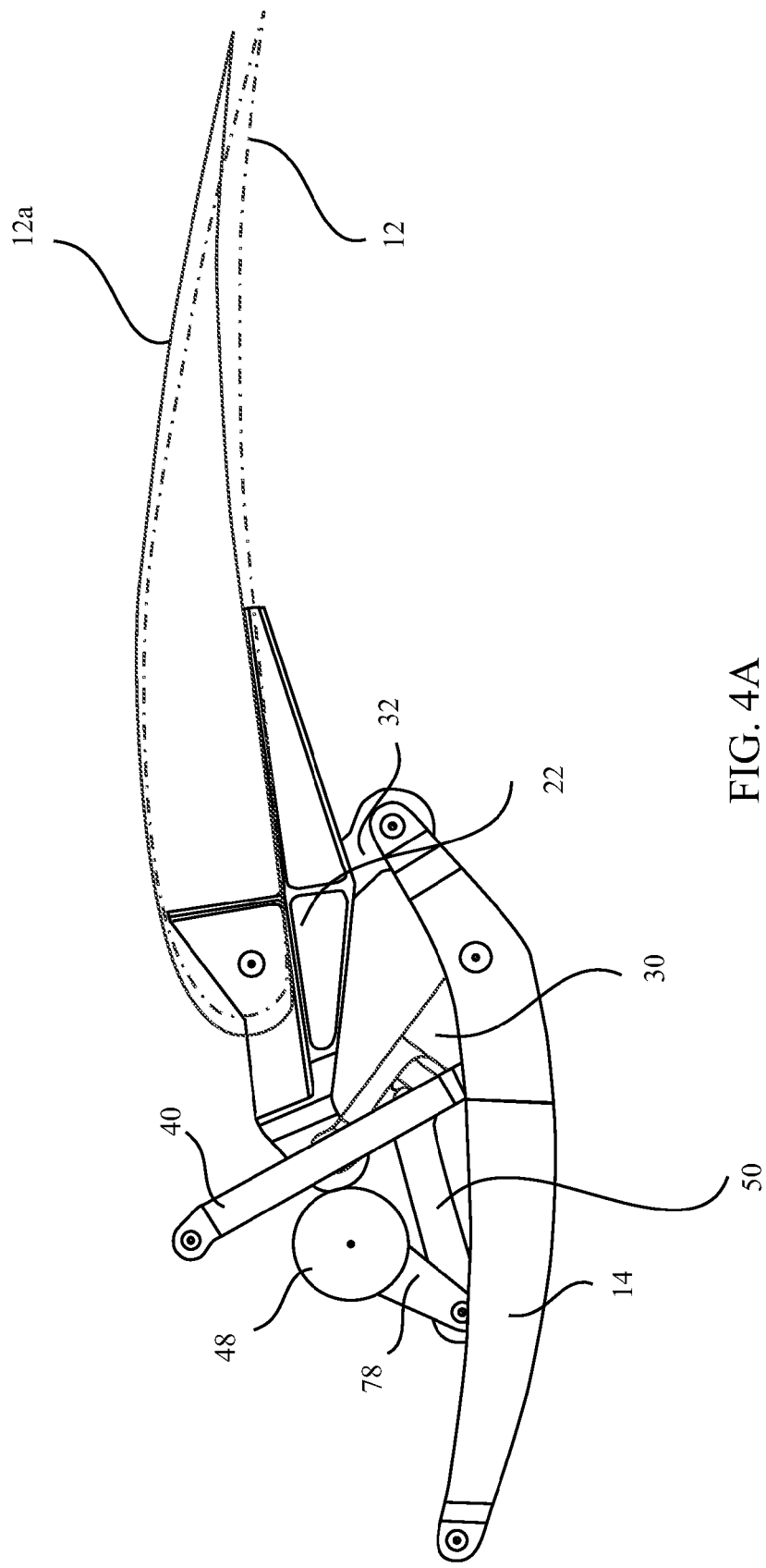
FIG. 4A is a side view of the aircraft flap mechanism with the flap in the TEVC up position for TEVC operation.

Operation of the mechanism through the range of flap positions is shown in FIGS. 4A-4G which represent standard flap positions for operation of the aircraft. The flap transitions smoothly between these positions which are provided only as reference points for the example embodiment. For the example embodiment the positions are TEVC up (nominally −2° angular deflection), TEVC down (nominally +2° angular deflection), shallow takeoff (nominally +9° angular deflection), mid takeoff (nominally +15° angular deflection), max takeoff (nominally +21° angular deflection), shallow landing (nominally +33° angular deflection) and max landing (nominally +42° angular deflection). FIG. 4A shows the aircraft flap mechanism with the flap 12 in the TEVC up position (identified as 12a) for TEVC operation. For positioning at the TEVC up position, the crank arm rotates clockwise relative to the view of FIG. 4A drawing the drive link 50 forward which, in turn, draws the AB link 30 forward. As shown in the drawing the relative positioning of the AB link 30, support beam aft portion 16, CD link 32 and flap carrier beam 22 in reaction to motion of the AB link with positional definition by the connection link 40 and support beam forward portion 34 with associated rotations about the axes at points A, B, C and D moves the flap with the flap nose 28 remaining on a contour 102 substantially parallel to a bottom surface of the wing relative to the neutral up position shown in phantom as flap 12. The flap nose needs to stay on contour during the TEVC range to not present a discontinuity or step on the wing lower surface which would result in excessive cruise drag.

Figure 4B:
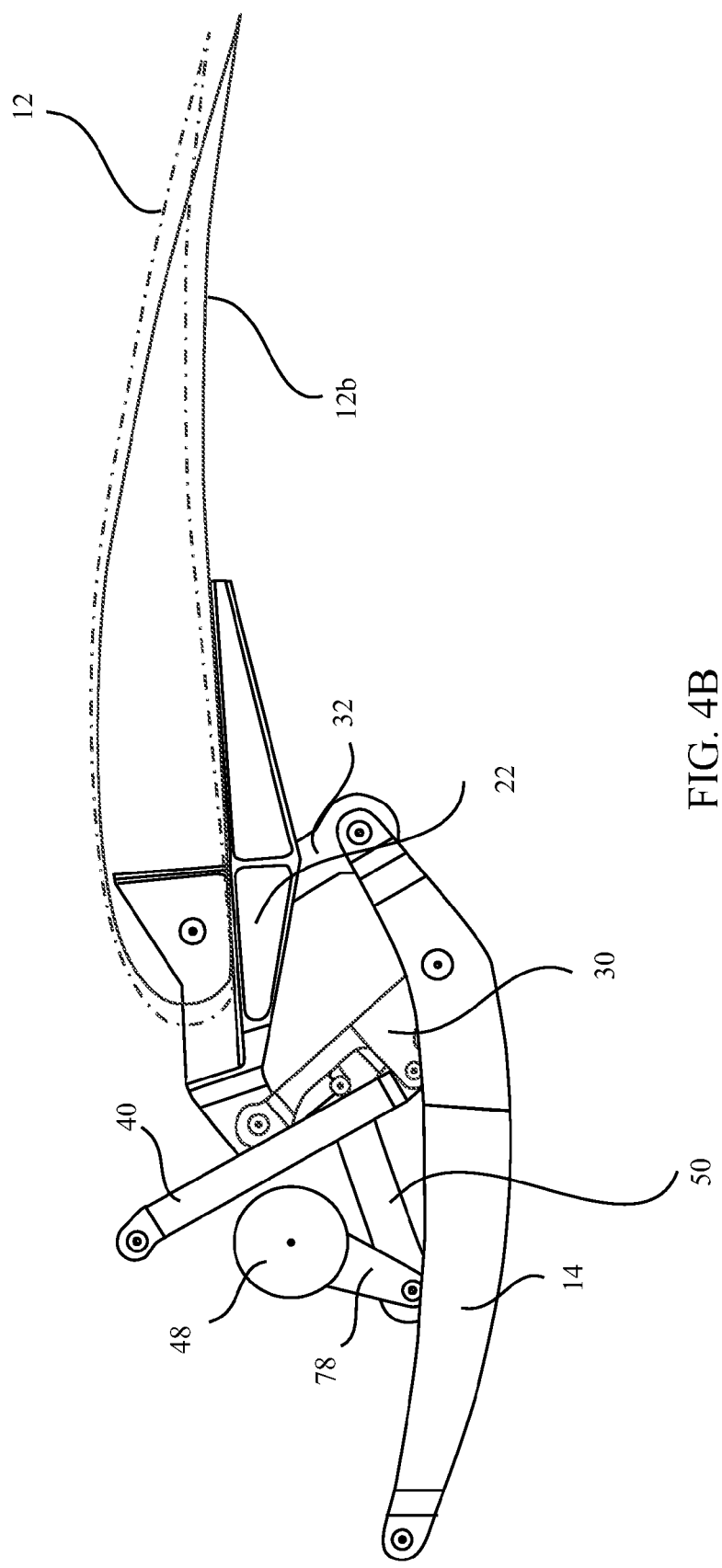
FIG. 4B is a side view of the aircraft flap mechanism with the flap in the TEVC down position for TEVC operation.

Similarly, motion of the flap in the TEVC down position (identified as 12b) for TEVC operation is shown in FIG. 4B. For positioning at TEVC down the crank arm rotates counterclockwise relative to the view of FIG. 4B urging the drive link 50 aft which, in turn, translates the AB link 30 aft. As shown in the drawing the relative positioning of the AB link 30, support beam aft portion 16, CD link 32 and flap carrier beam 22 in reaction to motion of the AB link with positional definition by the connection link 40 and support beam forward portion 34 with associated rotations about the axes at points A, B, C and D again moves the flap with the flap nose 28 remaining on contour 102 substantially parallel to a bottom surface of the wing relative to the neutral up position shown in phantom as flap 12. The nose portion 92 of the carrier beam extends between the side flanges 80a, 80b of the connection link and the forward end of drive link 50 an interconnected crank arm 58 from the rotary actuator are drawn between the siamesed members 62a, 62b of the support beam forward portion 34.

Figure 4C:
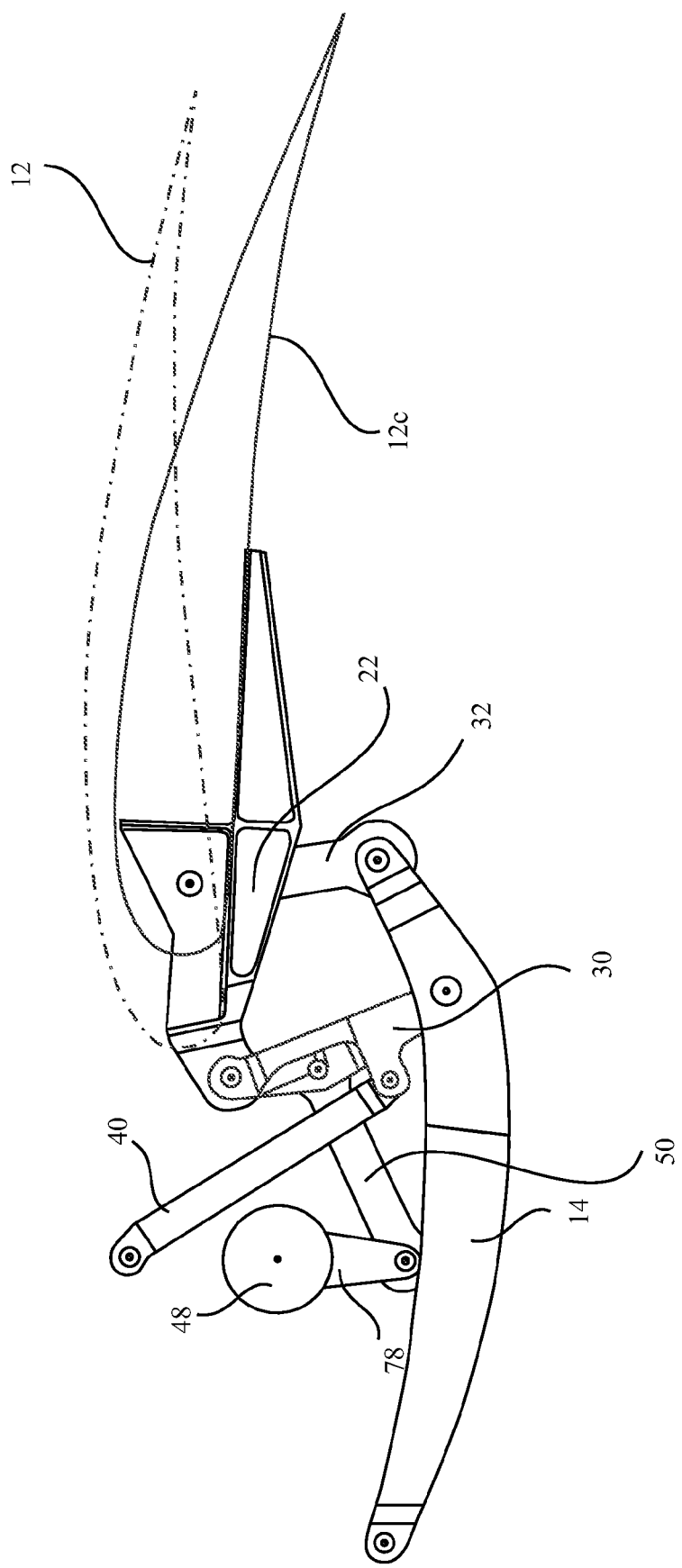
FIG. 4C is a side view of the aircraft flap mechanism with the flap in the shallow takeoff position.

Deployment of the flap from the TEVC down to the shallow takeoff position is shown in FIG. 4C as 12c. In this range of extension the flap transitions from being largely on contour in the TEVC range with no drooping spoilers, to a first shallow take-off position with drooping spoilers and the flap beginning to drop under contour. Further counterclockwise rotation of the crank arm urging the drive link 50 aft provides a component of motion which quickly drops the flap down below contour to accept a drooping spoiler. This arises through the relative positions of points A, B, F and G with the connection link 40 acting through point G rotating the support beam 14 clockwise which moves point A down drawing the quadrilateral linkage including the flap carrier beam 22 with the flap attached downward.

Figure 4D:
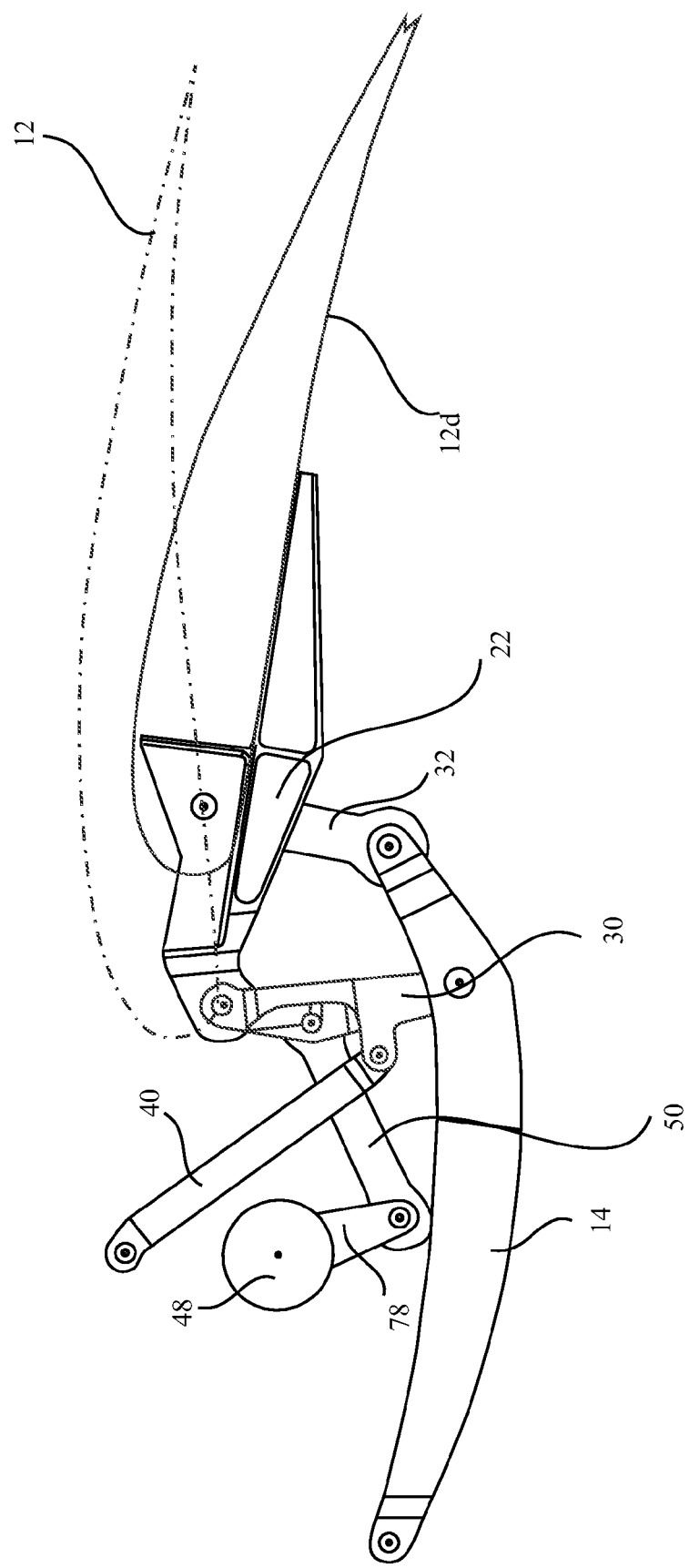
FIG. 4D is a side view of the aircraft flap mechanism with the flap in the mid-takeoff position.
Figure 4E:
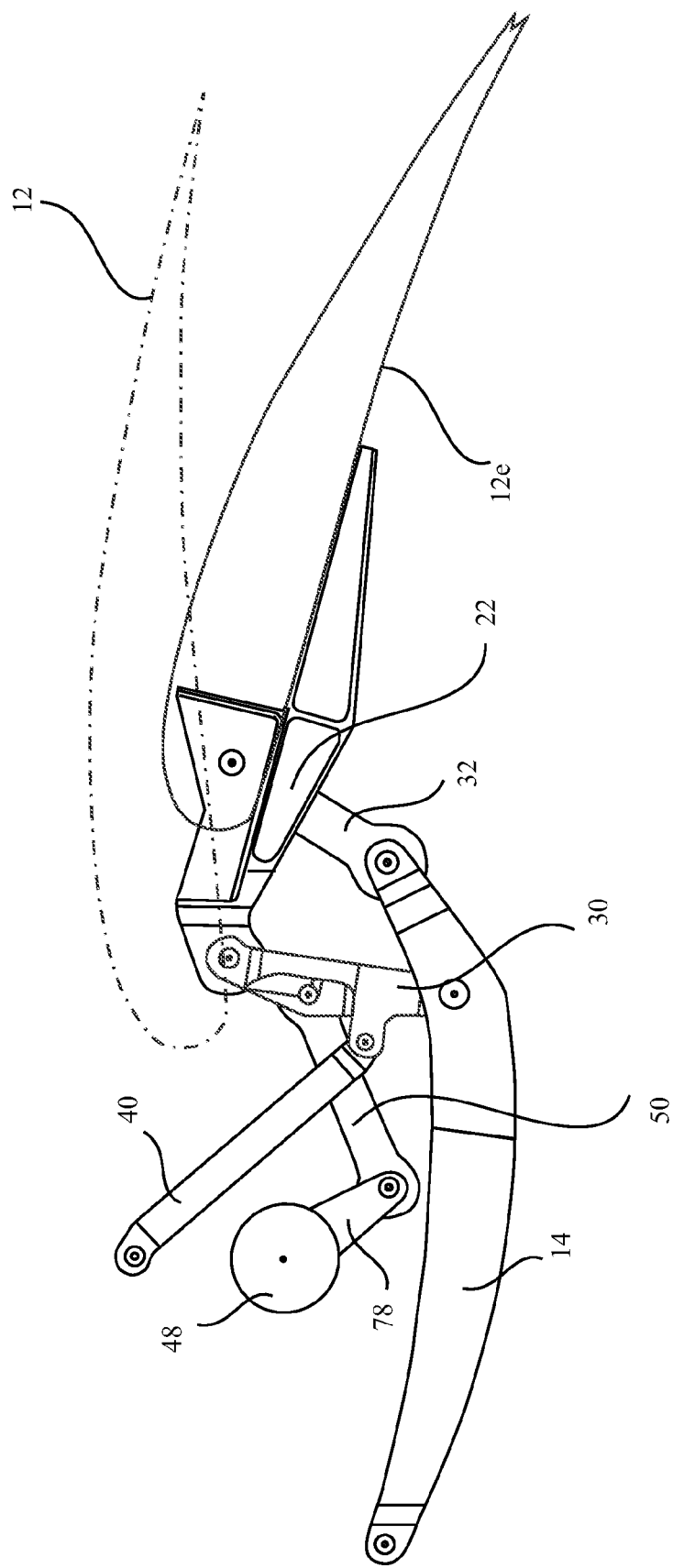
FIG. 4E is a side view of the aircraft flap mechanism with the flap in the max takeoff position.

FIG. 4D is a side view of the aircraft flap mechanism with the flap in the mid takeoff position (shown as 12d). The connection link 40 begins to influence significant rotation on the AB link which enhances the droop of the flap. Further extension is shown in FIG. 4E with the flap in the max takeoff position (shown as 12e) results in even greater angle influenced by the connection link.

Figure 4F:
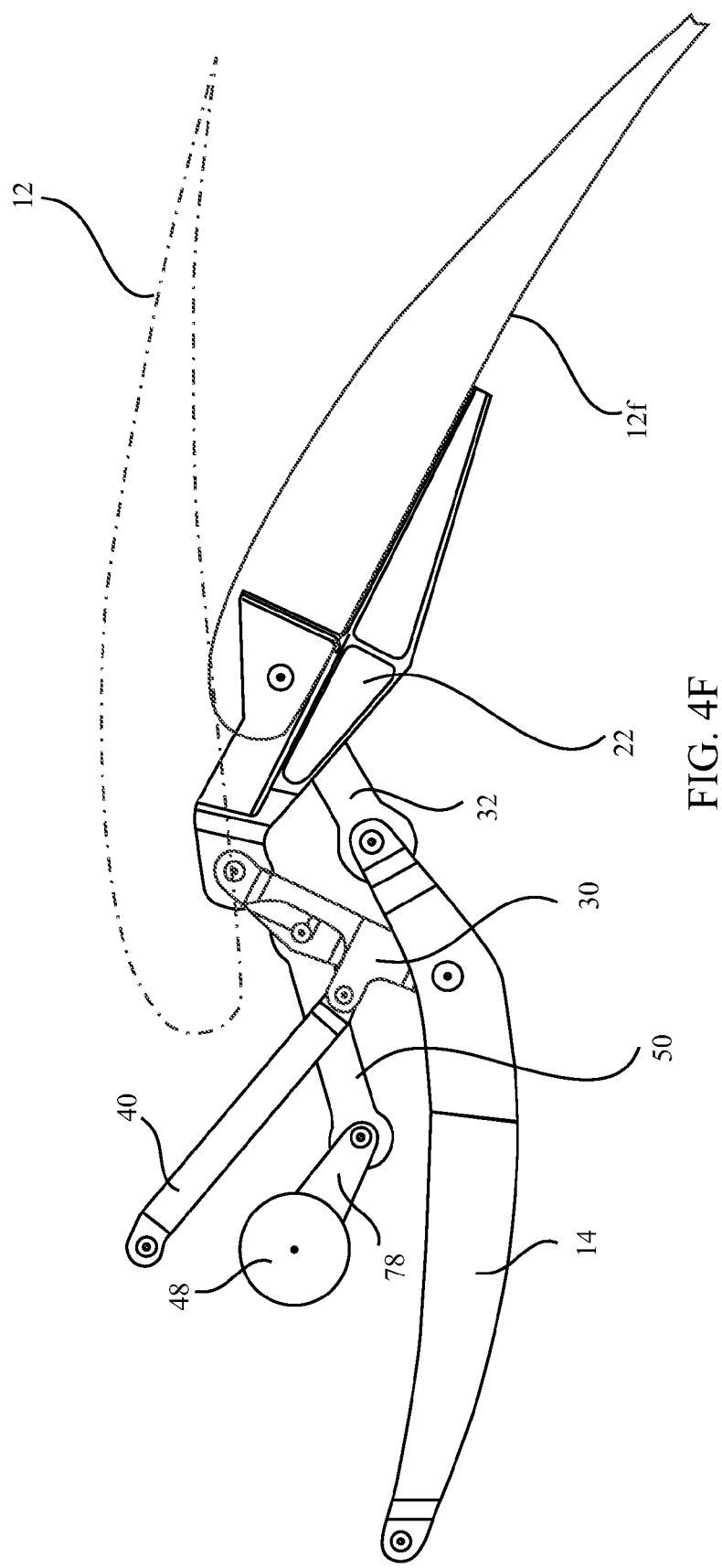
FIG. 4F is a side view of the aircraft flap mechanism with the flap in the shallow landing position.
Figure 4G:
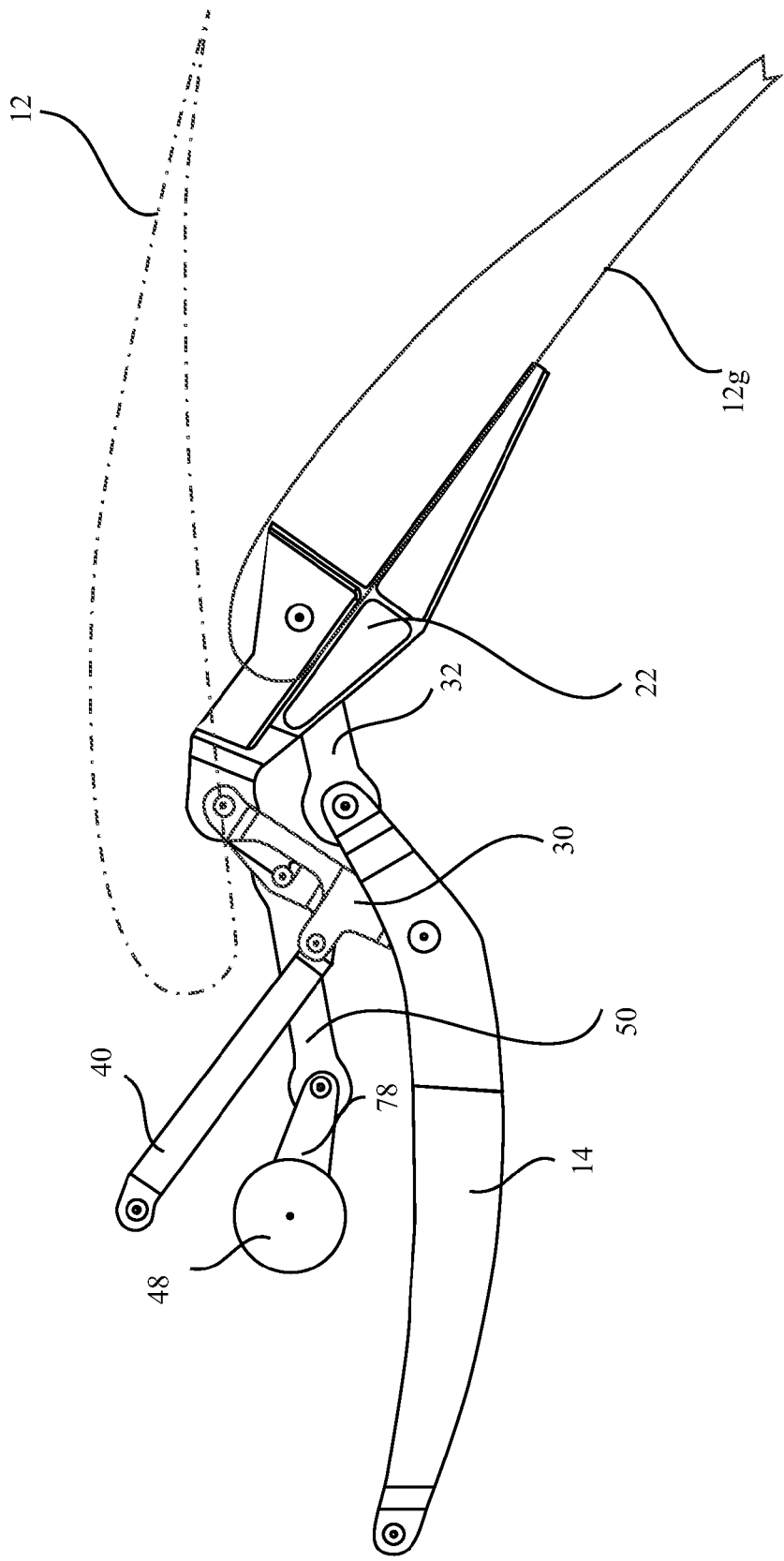
FIG. 4G is a side view of the aircraft flap mechanism with the flap in the max landing position.
Figure 5A:
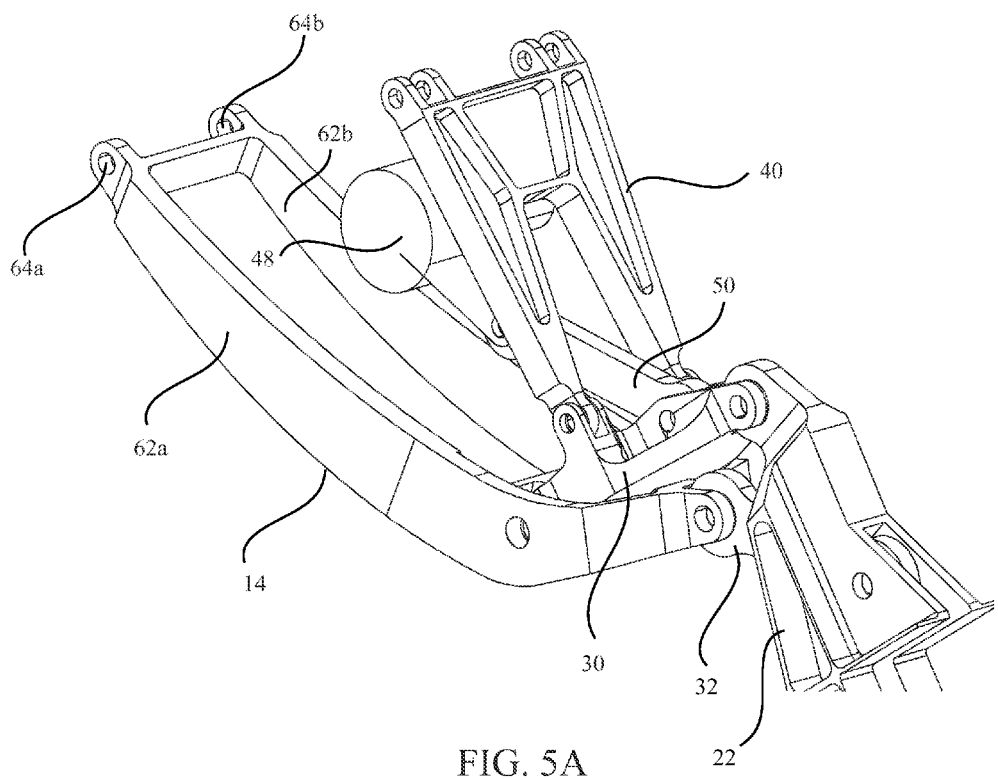
FIG. 5A is a top aft isometric view of the elements of the linkage with the flap in the landing position.
Figure 5B:
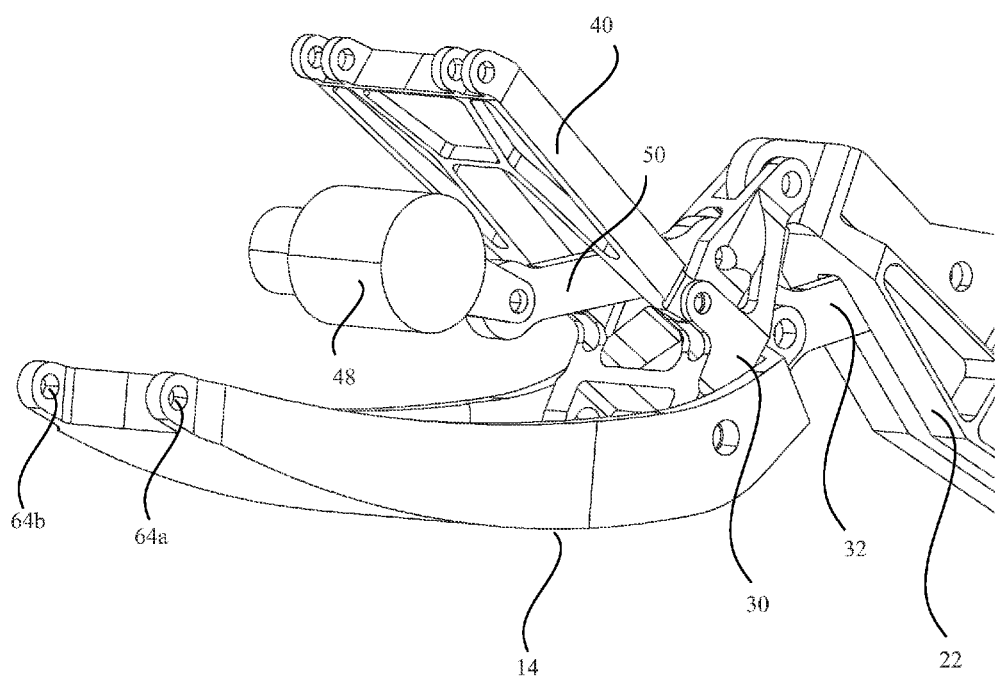
FIG. 5B is a bottom forward isometric view of the elements as shown in FIG. 5A.

Extension progress to the flap in the shallow landing position (FIG. 4F shown as 12f) and the max landing position (FIG. 4G shown as 12g) is accomplished with essentially complete rotated extension of the connection link between points F and G. FIGS. 5A and 5B show the details of the elements of the mechanism with the flap in the full flap or fully extended position. Connection link 40 is substantially fully extended for alignment of rotation axes at points F, 42, and G, 46 substantially perpendicular to the AB link 30. CD link 32 is substantially fully rotated about the rotation axis at point D, 20, approaching a horizontal position defining the full droop angle of the flap. Although the FG and CD links are fully extended and appear to approach an overcenter condition, the load direction of the JK drive link on the support beam link, and the load direction BC on the CD link both assure no jamming condition.

Figure 6A:
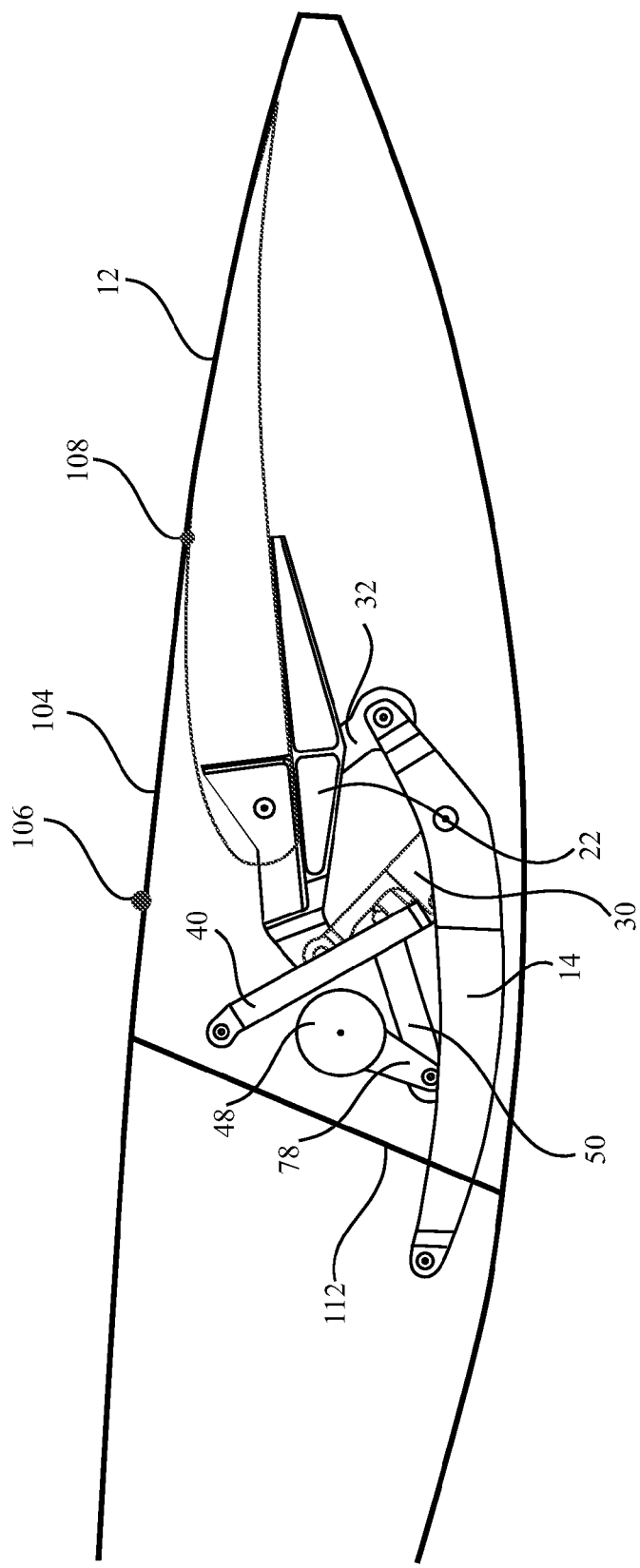
FIG. 6A is a side view of the aircraft flap mechanism with an outline of the fairing.
Figure 6B:
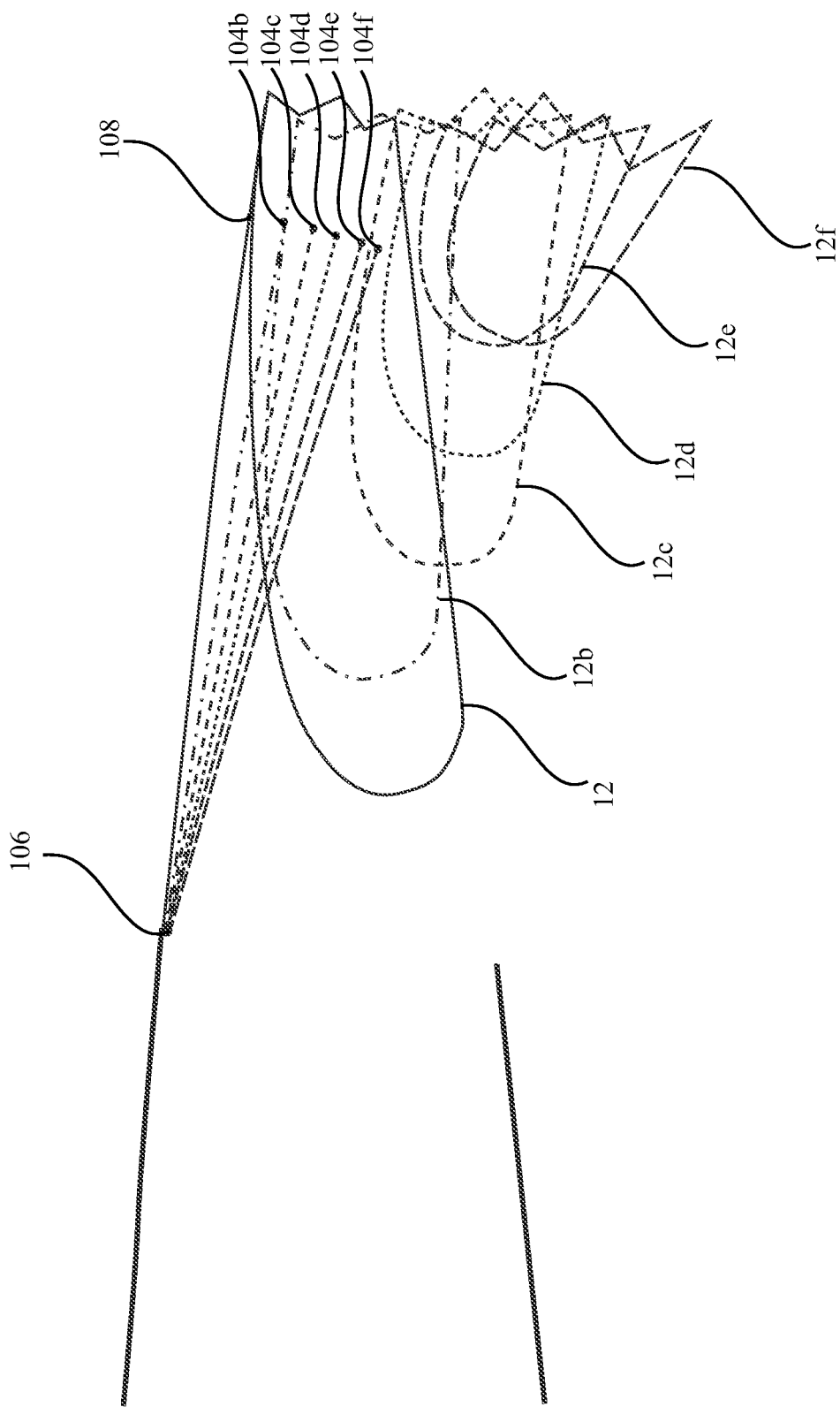
FIG. 6B is a side view showing the range of flap extension positions and associated spoiler droop.

The shallow depth of the mechanism created by the optimized lengths of the AB link and CD link as well as the nesting of the drive link, rotary actuator, and crank arm within the vertical outline of the support beam and the nesting of the flap support beam within the connection link allows a fairing outline 110 with a desirable depth profile. An example fairing split line 112 for droop of the aft portion of the fairing with the flap mechanism is shown in FIG. 6A. The compact motion of the mechanism further provides enhanced capability to incorporate drooping spoilers as shown in FIG. 6B. Upper surface spoiler 104 provides a span from hinge point 106 to a spoiler trailing edge 108. Motion of the flap created by the mechanism as described herein allows the trailing edge of the spoiler "drooping" from a nominal normal position as shown in (FIG. 1A), upward for the TEVC up position of the flap (seen in FIG. 4A) to varying downward drooping positions 104b, 104c, 104d, 104e, 104f and 104g corresponding to the TEVC down, shallow takeoff, mid takeoff, max takeoff, shallow landing and max landing positions of the flap described above and as shown in FIG. 6B.

Figure 7:
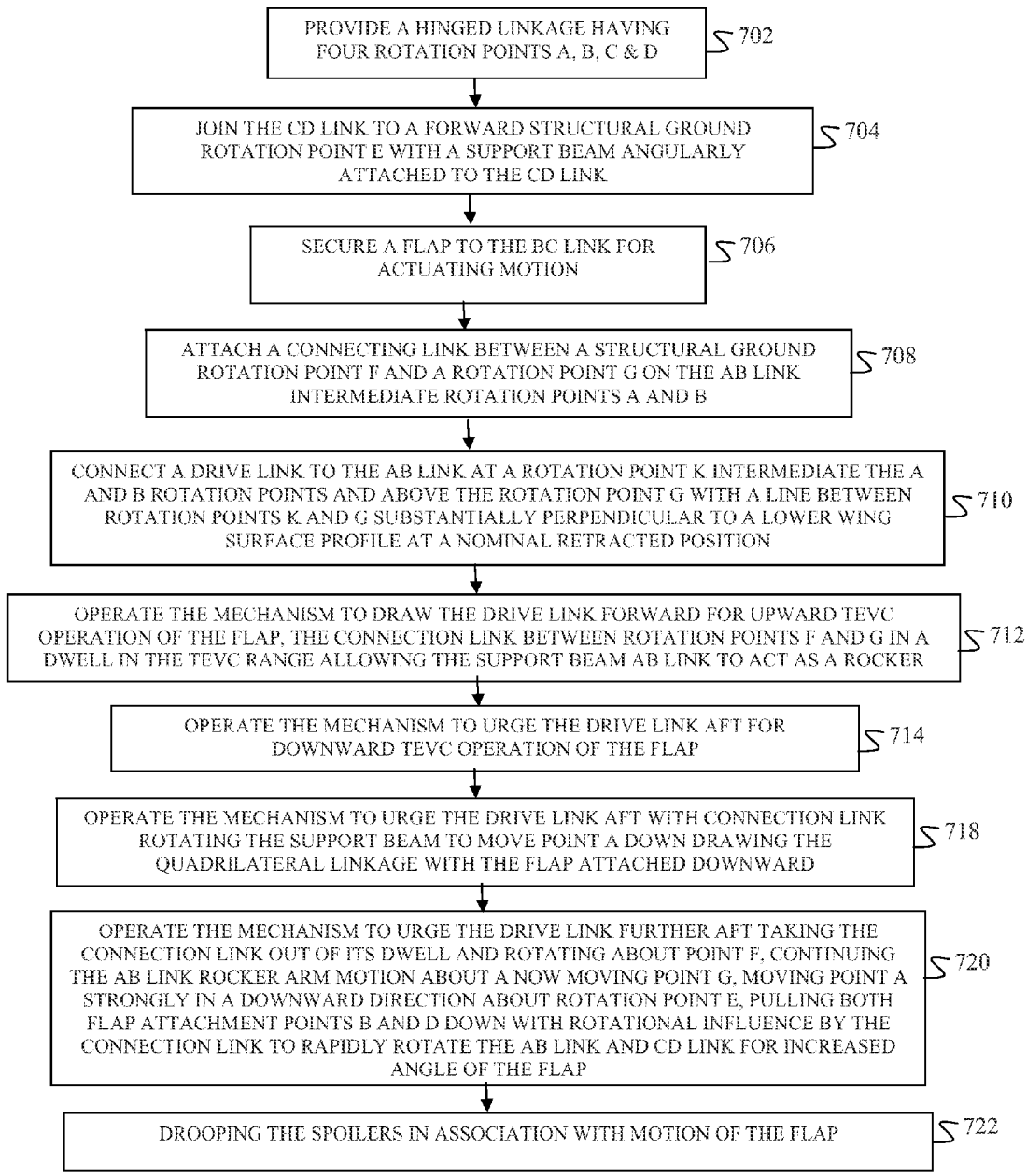
FIG. 7 is a flow chart of a method of operation for the embodiment described.

As shown in FIG. 7 operation of the flap mechanism for providing the desired TEVC, Fowler and droop motions incorporates providing a hinged linkage having four rotation axes at points A, B, C and D, with an AB link, a BC link, a CD link and an AD link, step 702. The CD link is further joined to a forward structural ground rotation point E with a support beam angularly attached to the CD link, step 704. A flap is secured to the BC link for actuating motion, step 706. A connecting link is attached between a structural hinge rotation axis at point F and a rotation axis at point G on the AB link intermediate points A and B, step 708, the rotation axis at point G established forward of a line interconnecting points A and B. A drive link is connected to the AB link at a rotation axis at point K intermediate the points A and B and above point G with a line between points K and G substantially perpendicular to a lower wing surface profile at a nominal retracted position, step 710. Operating the mechanism to draw the drive link forward for upward TEVC operation of the flap, step 712 and urge the drive link aft for downward TEVC operation of the flap, step 714 making the connection link between points F and G dwell in the TEVC range allowing the support beam AB link to act as a rocker arm rotating about a nearly stationary point G. The momentary orientation of the AB link and its rocker arm motion acts to move flap attachment point B in a direction roughly parallel with the lower surface of the wing and at the same time moves point A strongly in an up/down direction. Due to the extension of the support beam from point A to point D, the up/down movement of point A about point E serves as a multiplier for up/down movement of point D which in turn moves the CD link strongly up or down. The combination of flap attachment point B moving parallel with the wing lower surface and the CD link and flap attachment point D moving strongly up/down gives a flap motion where the flap nose stays roughly on contour and the trailing edge of the flap moves strongly up or down, or in other words the flap angle changes relatively quickly as the flap translates fore/aft. Operating the mechanism to urge the drive link aft with connection link 40 rotating the support beam 14 clockwise which moves point A down drawing the quadrilateral linkage including the flap carrier beam 22 with the flap attached downward, step 718. Operating the mechanism to urge the drive link further aft taking the connection link out of its dwell and rotating about point F, continuing the AB link rocker arm motion about a now moving point C moving point A strongly in a downward direction about rotation point E, pulling both flap attachment points B and D) down with rotational influence by the connection link to rapidly rotate the AB link and CD link for increased angle of the flap, step 720. Drooping of spoilers, step 722, may be accomplished in association with motion of the flap.

Figure 8:
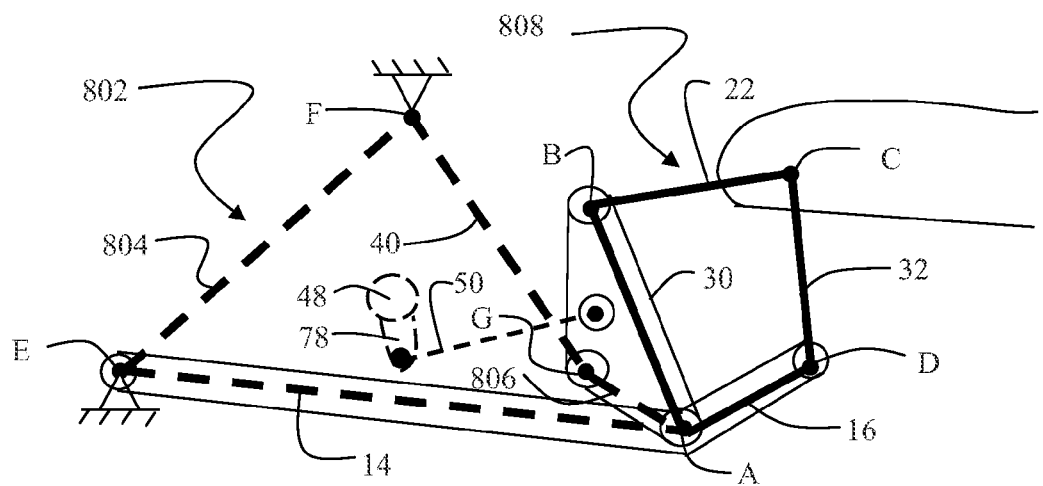
FIG. 8 is a depiction of the structure of the embodiment as interconnected first and second bar linkages; and, FIG. 9 is a depiction of the structure of the embodiment as a four bar linkage slaved to a six bar linkage.

As shown in FIG. 8, the embodiment disclosed may be viewed as a linkage pair. The quadrilateral linkage is a first four bar linkage 802 (shown in dashed lines) including a grounded link 804 fixed to the wing between points E and F with the connection link 40, support beam first portion 14 and a portion 806 of link 30 between points A and G providing the additional three bars. The first four bar linkage provides the hinged mounting for the second four bar linkage 808 (shown in solid lines) which incorporates the AB link 30, the flap support beam 22 between points B and C, the CD link 32 and the second portion of the support beam 16 between points A and D. The first and second four bar linkages include a common physical link, AB link 30, which is opposite the ground fixed link.

Figure 9:
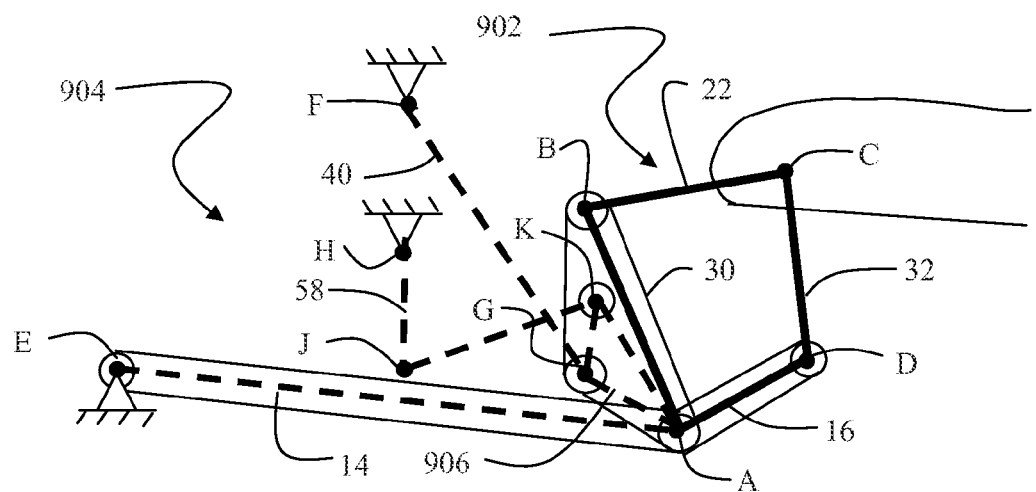

Alternatively as shown in FIG. 9, the embodiment disclosed may be viewed with the quadrilateral linkage as a four bar linkage 902 (shown in solid lines) slaved to a determinate six bar linkage 904 (shown in dashed lines) of the Stephenson III type. The four bar linkage incorporates the AB link 30, the flap support beam 22 between points B and C, the CD link 32 and the second portion of the support beam 16 between points A and D. The six bar linkage incorporates 3 grounded binary links; the support beam first portion 14 between points E and A, the connection link 40 between points E and F and the crank arm 58 extending from the rotary actuator fixed at point H. Links between points G and A, between points G and K and between points K and A all on link 30 provide a ternary link 906. Viewed in this form, the six bar linkage provides the hinged support for the four bar linkage with the ternary link of the six bar being a common physical element with the link between points A and B, link 30, of the four bar linkage.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A trailing edge flap mechanism for an aircraft comprising:
   a support beam having a first portion with a first rotation axis and a fourth rotation axis aft of the first rotation axis;
   a flap carrier beam supporting an aerodynamic flap, said carrier beam having a second rotation axis at a forward end and a third rotation axis within a nose contour of the flap aft of the second rotation axis;
   a first link interconnecting the first rotation axis and second rotation axis;
   a second link interconnecting the third rotation axis and fourth rotation axis;
   said support beam having a second portion extending angularly forward from the first portion and having a fifth rotation axis at a forward end for connection on a first fixed hinge axis;
   a connection link having a sixth rotation axis at a forward end for connection on a second fixed hinge axis and a seventh rotation axis connected to the first link intermediate the first and second rotation axes; and
   an actuator operably connected with a drive link pivotally engaged to the first link.

2. The trailing edge flap mechanism as defined in claim 1 wherein the actuation system includes a rotary actuator having rotation about a third fixed axis at an eighth axis of rotation and having an extending crank arm rotationally connected to a forward end of the drive link at a ninth rotation axis.

3. The trailing edge flap mechanism as defined in claim 2 wherein the third fixed axis is located proximate the rear spar of a wing.

4. The trailing edge flap mechanism as defined in claim 2 wherein the third fixed axis is intermediate the first and second fixed axes.

5. The trailing edge flap mechanism as defined in claim 1 wherein the pivotal engagement of the drive link is at a tenth rotation axis intermediate the first and second rotation axes.

6. The trailing edge flap mechanism as defined in claim 1 wherein the pivotal engagement of the drive link is at a tenth rotation axis intermediate the seventh rotation axis and the second rotation axis.

7. The trailing edge flap mechanism as defined in claim 1 wherein the connection link includes side flanges and a bridge connecting the side flanges.

8. The trailing edge flap mechanism as defined in claim 7 wherein the first link includes forwardly extending blades, the seventh rotation axis encompassed within the blades and the side flanges of the connection link are rotationally attached to the blades.

9. The trailing edge flap mechanism as defined in claim 8 wherein the support beam second portion includes siamesed members providing a center relief to receive the blades of the first link.

10. The trailing edge flap mechanism as defined in claim 7 wherein the forward end of the flap carrier beam is received between the side flanges of the connection link in a retracted position.

11. The trailing edge flap mechanism as defined in claim 7 wherein the first link comprises an A frame, said first rotation axis extending through bearing bores in feet of the A frame and a clevis at vertex to receive the forward portion of the flap carrier beam, said frame further including a second clevis extending forward from a forward face of the A frame to receive the drive link.

12. The trailing edge flap mechanism as defined in claim 11 wherein the interconnection of the forward portion of the flap carrier beam to the first clevis in the first link is a spherical bearing and the drive link interconnection to the second clevis in the first link is a spherical bearing.

13. The trailing edge flap mechanism as defined in claim 1 wherein the first link interconnection at the second rotation point and the second link interconnections at the third and fourth rotation points are spherical bearings.

14. An aircraft wing comprising:
an upper surface,
a lower surface,
a rear spar,
a trailing edge flap mechanism providing trailing edge variable camber having
a hinged quadrilateral linkage for Fowler, trailing edge viable camber and droop motion having
a support beam having a first portion with a first rotation axis and a fourth rotation axis aft of the first rotation axis;
a flap carrier beam supporting an aerodynamic flap, said carrier beam having a second rotation axis at a forward end and a third rotation axis within a nose contour of the flap aft of the third rotation axis;
a first link interconnecting the first rotation axis and second rotation axis;
a second link interconnecting the third rotation axis and fourth rotation axis;
said support beam having a second portion extending angularly forward from the first portion and having a fifth rotation axis at a forward end for ground connection as a first fixed hinge axis;
a connection link having a sixth rotation axis at a forward end for ground connection as a second fixed hinge axis and a seventh rotation axis connected to the first link intermediate the first and second rotation points;
an actuator connected to the first link; and
wherein actuation by the drive link provides initial forward and aft movement of a nose profile of the flap substantially parallel to the wing lower surface with the connection link in a dwell with extending aft movement removing the connection link from its dwell and with a multiplier effect by the support beam providing a rapidly changing angle of the flap with respect to the wing upper surface.

15. The aircraft wing as defined in claim 14 wherein the actuator is a rotary actuator mounted aft of the rear spar and having rotation about a third fixed axis at an eighth rotation point and having an extending crank arm rotationally connected to a forward end of the drive link at a ninth rotation point and the third fixed axis is intermediate the first and second fixed axes.

16. The aircraft wing as defined in claim 14 further comprising spoilers, said spoilers drooping in a coordinated manner with the flap angle.

17. A method for operating a trailing edge flap mechanism comprising:
providing a linkage having four axes of rotation at points A, B, C and D), with an AB link, a BC link, a CD link and an AD link;
joining the CD link to a forward structural fixed hinge axis at point E with a support beam angularly attached to the CD link at point D) and the AB link at point A;
securing a flap to the BC link for actuating motion;
attaching a connecting link between a structural fixed hinge axis at point F and an axis of rotation at point G on the AB link intermediate points A and B;
connecting a an actuator to the AB link at an axis of rotation at point K intermediate points A and B rotating the AB link forward for upward TEVC operation of the flap and urging the AB link aft for downward TEVC operation of the flap with the connection link in a dwell and the support beam AB link acting as a rocker arm rotating about a nearly stationary point G;
urging the AB link aft taking the connection link out of its dwell to rotate about point F with the AB link having continuing rocker arm motion about point G with point A moving strongly in a downward direction about rotation point E, the up/down movement of point A on the support beam about rotation point E serving as a multiplier for up/down movement of point D pulling both flap attachment points B and D down to position the flap; and,
urging the AB link further aft rotating the support beam clockwise moving point A down drawing point C with the attached AB link and CD link with the flap carrier beam downward for increased angle of the flap.

18. The method of claim 17 wherein point G is established forward of a line interconnecting rotation points A and B.

19. The method of claim 17 further wherein the step of urging the AB link aft further comprises drooping of spoilers in association with motion of the flap.

20. A trailing edge flap actuation mechanism comprising:
a linkage pair having
a first four bar linkage including
a grounded link fixed to a wing,
a connection link hinged to the ground link at a first end,
a support beam first portion hinged to the ground link at a second end, and
a first link attached to the connection link and support beam first portion opposite the ground link,
the first four bar linkage providing a hinged mounting for a second four bar linkage including
the first link in common with the first four bar linkage,
a flap support beam connected to the first link, and
a second link connected to the flap support beam and to a second portion of the support beam.

21. A trailing edge flap actuation mechanism as described in claim 20 farther comprising a rotary actuator having a crank arm connected to the first link.

22. A trailing edge flap actuation mechanism comprising:
a four bar linkage slaved to a six bar linkage, the four bar linkage incorporating
a first link,
a flap support beam attached to the first link,
a second link attached to the flap support beam and a second portion of a support beam,
the six bar linkage incorporating
three grounded binary links including a first portion of the support beam, a connection link and a crank arm extending from a rotary actuator, and
a ternary link interconnecting the grounded binary links, said ternary link integral with said first link.

* * * * *